US010936060B2

(12) United States Patent
Eraslan

(10) Patent No.: US 10,936,060 B2
(45) Date of Patent: Mar. 2, 2021

(54) SYSTEM AND METHOD FOR USING GAZE CONTROL TO CONTROL ELECTRONIC SWITCHES AND MACHINERY

(71) Applicant: Flex Ltd., Singapore (SG)

(72) Inventor: Mesut Gorkem Eraslan, San Jose, CA (US)

(73) Assignee: Flex Ltd., Singapore (SG)

( * ) Notice: Subject to any disclaimer, the term of this patent is extended or adjusted under 35 U.S.C. 154(b) by 0 days.

(21) Appl. No.: 16/570,748

(22) Filed: Sep. 13, 2019

(65) Prior Publication Data

US 2020/0081528 A1 Mar. 12, 2020

Related U.S. Application Data

(63) Continuation of application No. 16/029,808, filed on Jul. 9, 2018, now abandoned.

(60) Provisional application No. 62/659,506, filed on Apr. 18, 2018.

(51) Int. Cl.
*G06F 3/01* (2006.01)
*G06F 21/32* (2013.01)

(52) U.S. Cl.
CPC .............. *G06F 3/013* (2013.01); *G06F 21/32* (2013.01)

(58) Field of Classification Search
CPC ........... G06F 3/013; G06F 21/32; G06F 3/167
See application file for complete search history.

(56) References Cited

U.S. PATENT DOCUMENTS

| | | | |
|---|---|---|---|
| 2006/0192775 A1 | 8/2006 | Nicholson et al. |
| 2014/0125574 A1 | 5/2014 | Scavezze et al. |
| 2014/0184550 A1 | 7/2014 | Hennessey et al. |
| 2015/0227735 A1 | 8/2015 | Chappell |
| 2016/0132290 A1 | 5/2016 | Raux |
| 2016/0155443 A1 | 6/2016 | Khan et al. |
| 2019/0324531 A1 | 10/2019 | Eraslan |

FOREIGN PATENT DOCUMENTS

| | | |
|---|---|---|
| EP | 2985919 | 2/2016 |
| EP | 3179474 | 6/2017 |

OTHER PUBLICATIONS

International Search Report and Written Opinion for International (PCT) Patent Application No. PCT/IB2018/000858, dated Mar. 25, 2019, 18 pages.

Official Action for U.S. Appl. No. 16/029,808, dated Jun. 14, 2019 20 pages.

*Primary Examiner* — Abhishek Sarma
(74) *Attorney, Agent, or Firm* — Sheridan Ross P.C.

(57) ABSTRACT

A system that detects a gaze interaction from a user or animal based on information received from a camera. For example, the user looks directly at the camera or is looking at an angle toward the camera. In response to detecting the gaze interaction, the system identifies an associated action for controlling one or more of an electrical element and a mechanical element. For example, the action may be to control lighting system. The action is then initiated to control the one or more of the electrical element and the mechanical element.

20 Claims, 5 Drawing Sheets

100
104 Electrical and/or Mechanical Element(s)
102 Microprocessor
101 Camera(s)
103 Memory
105 Gaze Applicaton
110

200
1 2 3
Q 201A Q 201B Q 201C
220 211
4 5 6
Q 201D Q 201E Center Gaze Q 201F
7 8 9
Q 201G Q 201H Q 201N
210B 210A 110

SYSTEM AND METHOD FOR USING GAZE CONTROL TO CONTROL ELECTRONIC SWITCHES AND MACHINERY

CROSS REFERENCE TO RELATED APPLICATIONS

The present application is a continuation of and claims priority to U.S. patent application Ser. No. 16/029,808, filed on Jul. 9, 2018, entitled "SYSTEM AND METHOD FOR USING GAZE CONTROL TO CONTROL ELECTRONIC SWITCHES AND MACHINERY," which claims the benefits of and priority, under 35 U.S.C. § 119(e), to U.S. Provisional Application Ser. No. 62/659,506, filed on Apr. 18, 2018, entitled "METHOD TO USE HUMAN AND ANIMAL GAZE TO CONTROL ELECTRONIC SWITCHES AND MACHINERY"", which is incorporated herein by this reference in its entirety. Each of the aforementioned applications is incorporated herein by reference in their entirety for all that they teach and for all purposes.

FIELD

The present invention is related generally to gaze recognition and specifically using gaze recognition to control switches and machinery.

BACKGROUND

Currently, there are a couple of ways humans interact with machines/electrical components. The most common way is by touching or a tactile input device, such as a button or touchscreen. Another way to interact with machines/electrical components that is growing in popularity is use speech recognition to translate the speech into commands thereby enabling the machine/electrical component to understand human speech. These types of systems can have physical limitations of where a device is incapable of providing voice and or touch interaction. For example, the device may not have an area that can provide tactile input or does not have digital voice processing capabilities. For example, a small sensor may be unable to provide a tactile input or voice processing capabilities (e.g., supporting a microphone/speaker) due to its size. Alternatively, a device may not be easily reachable due to distance, thus limiting any tactile input and/or voice access.

DETAILED DESCRIPTION

Figure 1:
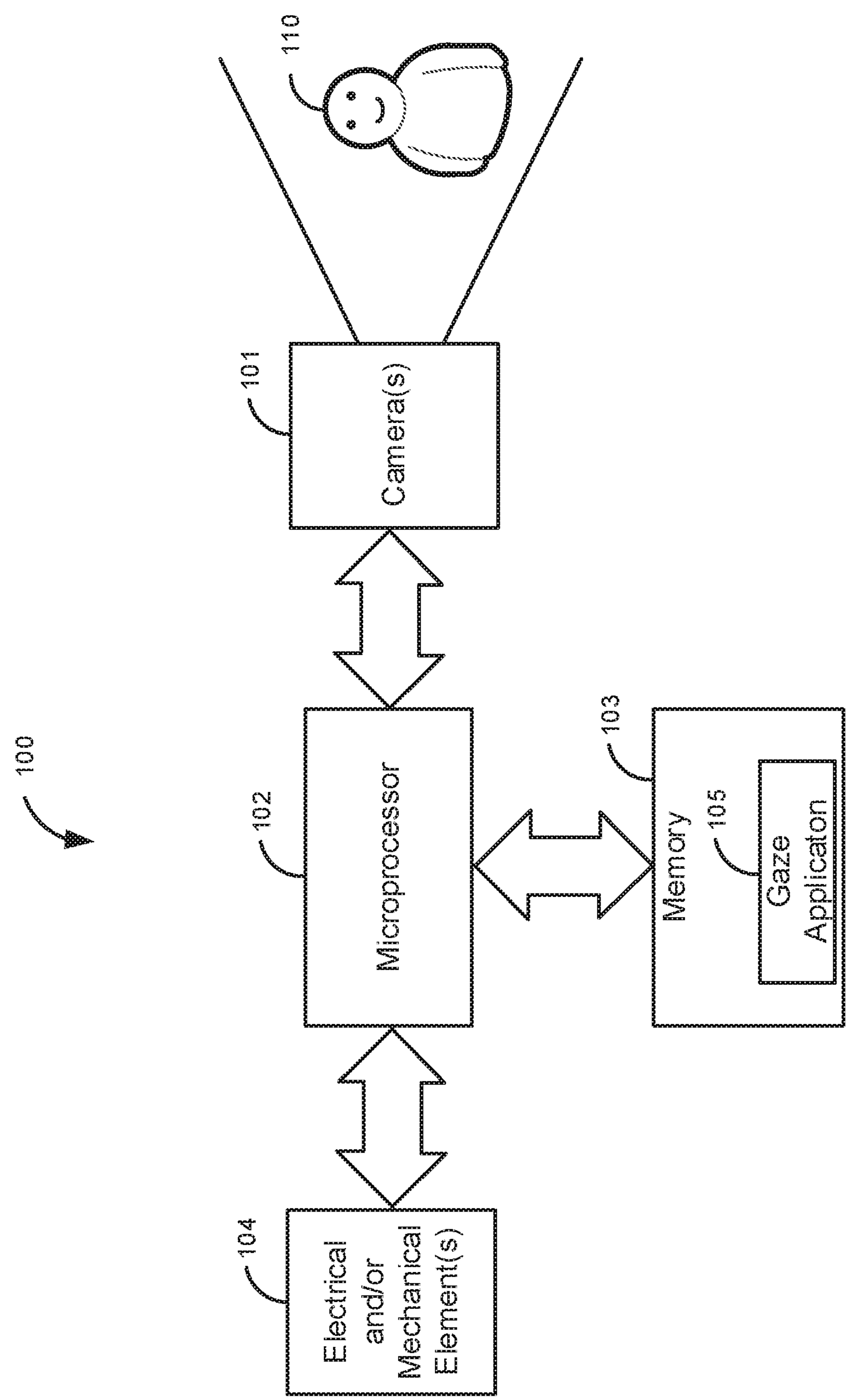
FIG. 1 is a block diagram of a first illustrative system for using gaze to control an electrical and/or mechanical element.

FIG. 1 is a block diagram of a first illustrative system 100 for using gaze to control electrical and/or mechanical element(s) 104. The first illustrative system 100 comprises camera(s) 101, a microprocessor 102, a memory 103, and the electrical and/or mechanical element(s) 104.

The camera(s) 101 can be or may include any type of camera 101 that can capture an image, such as a two dimensional camera, an acoustic camera (a three dimensional camera), an inferred camera, a digital camera, a video camera, and/or the like. The camera(s) 101 may send a video stream, a picture, and/or the like. The camera(s) 101 may also capture an audio stream associated with the video stream or picture (e.g., from a microphone (not shown)).

The microprocessor 102 can be or may or can include any known microprocessor 102, such as a microcontroller, an application specific microprocessor 102, a digital signaling processor, a multi-core processor, and/or the like. The microprocessor 102 interfaces with the camera(s) 101, the memory 103, and the electrical and/or mechanical element (s) 104. The microprocessor 102 may interface with the camera(s) 101, the memory 103, and the electrical and/or mechanical element(s) 104 either directly (e.g., in the same device and/or on the same circuit board), via a computer network, via wiring, and/or the like. For example, the camera(s) 101 and/or the electrical and/or mechanical element(s) 104 may be connected to the microprocessor 102/memory 103 via a computer network. The microprocessor 102 may comprise multiple processors. For example, the microprocessor 102 may comprise a microprocessor 102 in the camera 101 or a touch screen device along with a central microprocessor 102.

The camera(s) 101, the microprocessor 102, the memory 103, and the electrical and/or mechanical element(s) 104 may be in the same device. Alternatively, the camera(s) 101 may be external from the microprocessor 102/memory 103/electrical and/or mechanical element(s) 104. For example, the camera 101 may be an external camera 101 attached to a computer monitor, an array of cameras 101 embedded in a monitor, a camera 101 at a door, an array of cameras 101 in a room, and/or the like.

The memory 103 can be or may include, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing.

The memory 103 further comprises a gaze application 105. The gaze application 105 can detect and manage gaze information received from the camera(s) 101. The gaze application 105 can initiate different actions based on detecting and managing gaze. The gaze application 105 can track the gaze or eye of a human and/or an animal. The detection of the gaze interaction may be used in situations where a user's hands are occupied, where the user 110 does not have hands, where a device is out of arms reach (e.g., a light in a ceiling), where there is no space on the device that allows integration of touch interaction, where speech interaction is not possible, and/or the like.

The gaze application 105 can control a gaze interaction that may be a primary or a supplementary gaze interaction, which can be used in combination with other types of interactions, such as speech interactions, touch interactions (e.g., a user 110 touching a touch screen or button), gesture interactions, and/or the like. For example, a speech interaction may follow a gaze interaction; in this case, the gaze of a user 110 looking at a device tells the device to turn on a microphone and then wait/listen for a speech interaction. In another embodiment, the gaze application 105 can turn off the microphone when no gaze detected, or in other words, when the user 110 is not looking at the device.

The gaze application 105 can be used not only to activate a switch or a device, but also can be used to deactivate the switch or device by measuring either the point of gaze (where one is looking) and/or the motion of an eye relative to the head. There are a number of methods for measuring eye movement that may be employed by the gaze application 105. One variant uses video images from which the eye position is extracted. Other embodiments may use search coils, eye-attached tracking (e.g., a special contact lens with an embedded mirror or magnetic field sensor), electric potential measurement (e.g., using electrodes positioned around the eyes of the user 110 to generate an electrooculogram signal), and/or the like.

In addition, the gaze application 105 can use a video-based eye-tracker. The camera 101 focuses on one or both eyes and records eye movement as the user 110 looks a particular object. The gaze application 105 can use eye-trackers to track the center of the pupil and infrared/near-infrared non-collimated light to create corneal reflections (CR). A vector between the pupil center and the conical reflections may be used to compute the point of regard on the surface of the eye or the gaze direction of the eye. In this embodiment, a simple calibration procedure of the user 110 may be needed before using the gaze application 103.

The gaze application 105 may support various types of infrared/near-infrared (also known as active light) eye-tracking techniques. For example, the gaze application 105 may support bright-pupil and dark-pupil techniques. Differences between the two may be based on the location of an illumination source with respect to the camera 101. If the illumination is coaxial with the optical path, then the eye acts as a retroreflector as the light reflects off the retina creating a bright pupil effect similar to red eye. If the illumination source is offset from the optical path, then the pupil appears dark because the retroreflection from the retina is directed away from the camera 101.

Bright-pupil tracking creates greater iris/pupil contrast, thus allowing more robust eye-tracking with all types of iris pigmentation. In addition, bright-pupil tracking greatly reduces interference caused by eyelashes and other obscuring features. Bright-pupil tracking also allows tracking in lighting conditions ranging from total darkness to very bright light. However, bright-pupil techniques are not as effective for tracking gaze in outdoors conditions and where extraneous inferred sources interfere with bright-pupil tracking.

In another embodiment, the gaze application 105 may use a process known as passive light tracking. Passive light tracking uses visible light to illuminate things which may cause distractions to users 110. Another challenge with this passive light tracking is that the contrast of the pupil is less than in active light methods, therefore, the center of iris is used for calculating the gaze vector instead. This calculation needs to detect the boundary of the iris and the white sclera (limbus tracking). In addition, passive light tracking presents another challenge, such as detecting vertical eye movements due to obstruction of eyelids.

In some embodiments the gaze application 105 may use an eye-tracking device. For example, an eye tracking device may be a head-mounted device, a chin rest (request the user's head to be stable), an attached device (attached to the user 110) that remotely and automatically tracks head motion. These types of devices typically use a sampling rate of at least 30 Hz. Although a sampling rate of 50/60 Hz is more common, many video-based eye trackers run at 240, 350 or even 1000/1250 Hz, speeds in order to capture fixational eye movements and/or correctly measure saccade dynamics.

Eye movements are typically divided into fixations and saccades (i.e., when the eye gaze pauses in a certain position and when it moves to another position respectively). The resulting series of fixations and saccades is called a scan-path. Smooth pursuit describes the eye following a moving object. Fixational eye movements may include micro saccades: small, involuntary saccades that occur during attempted fixation. Most information from the eye is made available during a fixation or smooth pursuit, but not during a saccade. The central one or two degrees of the visual angle (that area of the visual field which falls on the fovea) provides the bulk of the visual information; the input from larger eccentricities (the periphery) has less resolution and little to no color, even though contrast and movement is detected better in peripheral vision. Hence, the locations of fixations or smooth pursuit along a scan-path shows what information loci on the stimulus was processed during an eye-tracking session. On average, fixations last for around 200 milliseconds (ms) during the reading of linguistic text, and 350 ms during the viewing of a scene. Preparing a saccade towards a new goal takes around 200 ms.

Scan-paths are useful for analyzing cognitive intent, interest, and salience. Other biological factors (some as simple as gender) may affect the scan-path as well. For example, eye tracking in human-computer interaction (HCI) typically investigates the scan-path for usability purposes and/or as a method of input in gaze-contingent displays (also known as gaze-based interfaces).

Eye-trackers typically measure the rotation of the eye with respect to some frame of reference. The frame of reference is usually tied to the measuring system. Thus, if the measuring system is head-mounted (e.g., as with Electrooculography (EOG) or a video-based system mounted to a helmet) then the eye-in-head angles are measured using the frame of reference. In order to deduce the line of sight in world coordinates, the user's head must be kept in a constant position or its movements must be tracked as well. In these embodiments, head direction is added to eye-in-head direction to determine the gaze direction.

If the gaze application 105 uses a table-mounted device (e.g., as with scleral search coils or table-mounted camera 101 ("remote") systems), gaze angles are measured directly in world coordinates. Typically, in these situations head movements are prohibited. For example, the head position is fixed using a bite bar or a forehead support. In this embodiment, a head-centered reference frame is identical to a world-centered reference frame. Or colloquially, the eye-in-head position directly determines the gaze direction.

In one embodiment, the gaze application 105 may be a distributed gaze application. The gaze application 105 may be in multiple devices that communicate via a computer network, such as the Internet. For example, the gaze application 105 may be in a distributed access system that manages door access in multiple buildings.

The electrical and/or mechanical elements 104 can be or may include a variety of elements, such as, a computer system, an electronic switch, an electronic control (e.g., a volume control), a relay, a system that sends electronic messages, an alarm system, a door lock, a disk space (e.g., grant access to the disk space), a dog/cat feeder, a vehicle lock, a garage door opener, a vehicle starter, a lighting system, an individual light, an electrode (e.g., for moving a muscle), a listening device (e.g., Amazon's Alexa®), a printer, a scanner, a computer, a laptop, a note pad, a heating/air system, a sprinkler system, an individual sprinkler, a temperature gauge, a card scanner, a biometric scanner, a sensor, a camera 101, and/or the like.

The first illustrative system 100 also shows a user 110. The user 110 may be any person that has eyes that can be used to detect gaze. In FIG. 1, the user 110 is shown to be in view of the camera(s) 101. Although not shown in FIG. 1, an animal may also be within view of the camera(s) 101 instead of the user 110 (or along with the user 110).

Figure 2:
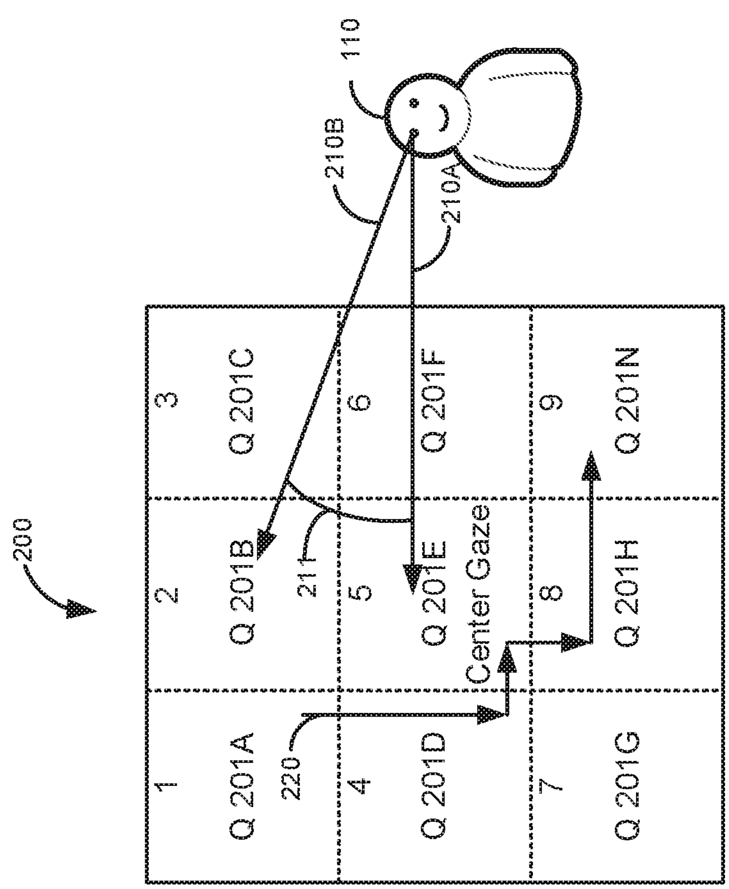
FIG. 2 is a diagram that shows a process for using gaze to control an electrical and/or mechanical element using gaze quadrants.

FIG. 2 is a diagram 200 that shows a process for using gaze to control an electrical and/or mechanical element 104 using gaze quadrants 201A-201N (also identified by the numbers 1-9). The diagram 200 comprises the gaze quadrants 201A-201N and the user 110 (a person). The gaze quadrants 201A-201N are used to represent where a user 110 is gazing (view angles from the center gaze). In FIG. 2, there are nine illustrative gaze quadrants 201A-201N. However, in other embodiments, there may be more or less gaze quadrants 201. For example, there may only be three gaze quadrants (a top gaze quadrant (the area of gaze quadrants 201A-201C), a center gaze quadrant (the area of gaze quadrants 201D-201F), and a bottom gaze quadrant (the area of gaze quadrants 201G-201N).

If the user 110 is looking directly at the camera 101 as shown in step 210A, the user 110 is gazing at gaze quadrant 201E (the center gaze). If the same user 110 then looks up as shown in step 210B, the user 110 is gazing at gaze quadrant 201B. In this example, the gaze angle 211 changes a number of degrees, which is detected by the gaze application 105 (e.g., using one or more of the processes described above). Likewise, when the user 110 gazes at the gaze quadrant 201C (or any other gaze quadrant 201), a different gaze angle (e.g., a left gaze angle and an up gaze angle in this example) is determined (e.g., based on a difference from the center gaze) to identify that the user 110 is looking at the gaze quadrant 201C. The gaze of the user 110 may be coupled with a time period. For example, the user 110 may have to look at the gaze quadrant 201 for a specific time period (e.g., 2 seconds).

When the user 110 gazes at one of the gaze quadrants 201 (e.g., for the specific time period), there is an action associated with the gaze quadrant 201. Each of the gaze quadrants 201A-201N can have a specific action associated with the gaze quadrant 201. For example, when the user 110 gazes at the gaze quadrant 210E in step 210A, the action may be to ask the user 110 if he wants to place an order for a product from a specific service provider (e.g., Amazon®). The user 110 then can then say yes or no. If the user 110 says yes, the user 110 can then proceed and place the order. If the user 110 gazes that the gaze quadrant 201B as shown in step 210B, the action may be to ask the user 110 if he wants to place an order using Google®. The user 110 can then say yes or no. Likewise, different actions may occur when the user 110 gazes at the various other gaze quadrants 201.

The gaze quadrants 201A-201N may be for associated actions where the gaze quadrants 201A-201N change based on different contexts of the associated actions. For example, gaze quadrant 201E (the center gaze) may be used to turn on a radio, which then changes the context of the gaze quadrants 201A-201N. For example, the gaze quadrants 201A-201D and 201F-201N may then be used to the select particular radio stations, particular playlists, and/or albums while the gaze quadrant 201E (the center gaze) is used to turn off the radio.

Alternatively, the gaze quadrants 201A-201N may be used for completely unrelated actions. For example, gaze quadrant 201A may be to turn on the lights and gaze quadrant 201B may be used to place a voice call to a particular user 110.

In one embodiment, as the user 110 changes the gaze angle from one gaze quadrant 201 to another gaze quadrant 201, the user 110 may be provided with an audible and/or visible indication of the action associated with the gaze quadrant 201. For example, using the radio example from above where the gaze quadrants 201A-201D and 201F-201N represent individual radio stations, when the user 110 is gazing in the gaze quadrant 201A, the radio says "country 107.9, select?" The user 110 could then say "select" to select the radio station or change the gaze angle to a different gaze quadrant 201. For example, when the user 110 changes the gaze angle to gaze at gaze quadrant 201B, the radio says "rock 97.5, select?" The user 110 could then say "select" to select the radio station. When the user 110 gazes at the gaze quadrant 201E, the radio says "turn off the radio?" The user 110 could the say "yes" and turn off the radio.

In one embodiment, the gaze quadrants 201A-201N may be used by another party (a party who is not being viewed by the camera 101). For example, the gaze application 105 may be part of an alarm system that is used to detect unauthorized access to a building or facility (a restricted area). When an unauthorized user 110 enters the restricted area and the user 110 does not gaze directly at the camera 101, a silent alarm is generated (e.g., a security guard's screen or phone flashes/vibrates). When the unauthorized user 110 looks directly at the camera 101, an audible alarm sounds. The alarm system may also use other types of input, such as, facial recognition, biometrics, and/or the like.

In one embodiment, the gaze quadrants 201A-201N can be used to detect a gaze sequence 220 by the user 110. For example, as shown in FIG. 2, the gaze quadrants 201A-201N can be used to detect the gaze sequence 220. The gaze sequence 220 is where the user 110 gazes using the gaze sequence 1->4->5->8->9 (represented by the numbers at the top of the gaze quadrants 201A-201N) to initiate an action. For example, the gaze sequence 220 may be used to authenticate a user 110 (e.g., where there is no display or keyboard). The gaze quadrants 201A-201N may represent a non-displayed keypad (representing the numbers 1-9). The user 110 can select the gaze quadrant 201 by looking at the gaze quadrate 201 (an angle from center) for a time period. This may be coupled with a voice input. For example, the user 110 may say "select" when looking at the gaze quadrant 201A or "done" when entering the gaze sequence 220.

In one embodiment, the gaze quadrants 201A-201N are actually printed on a wall (or displayed on a device). For example, the gaze quadrants 201A-201N could be printed on a wall to look similar to FIG. 200 (without any text or numbers) where the camera 101 is located in the center of gaze quadrant 201E. Alternatively, the gaze quadrants 201A-201N could have text or numbers (e.g., 1-9 as shown in FIG. 2). In this example, the gaze sequence 220 represents the Personal Identification Number (PIN) of 1->4->5->8->9. This type of authentication could be coupled with audible sounds (e.g., "select") as the gaze moves from one gaze quadrant 201 to another gaze quadrant 201. In this embodiment, the audible sound would typically not state the numbers because another person could be listening and hear the PIN. In this embodiment, the gaze quadrants 201A-201N act like keypad without actually using a mechanical keypad.

In one embodiment, the gaze sequence 220 may be coupled with facial recognition. For example, the user's face is compared to a stored face print of the user 110. Both the face print and the gaze sequence 220 have to match. In one embodiment, authentication process may use multiple gaze sequences 220 from multiple users 110 (coupled with face prints) to provide an action. For example, access to a secure area may only be granted based on two people providing separate gaze sequences/facial recognition together (or in sequence).

In one embodiment, the gaze quadrants 201A-201N could each have at least one camera 101 in each gaze quadrant 201. In this embodiment, the gaze sequence 220 is detected when the user 110 is directly looking at the particular camera 101 in the gaze quadrant 201. For example, the gaze quadrants 201A-201N could be shown on an optical input screen (essentially an array of cameras 101 that captures gaze over the gaze quadrants 201A-201N of the optical input screen). The optical input screen captures the direct gaze of the user 110 for each gaze quadrant 201A-201N. In one embodiment, the cameras 101 in each gaze quadrant 201 may be in various places. For example, the cameras 101 may be two or more cameras 101 attached to the top of monitor, embedded in the top of the monitor, placed around the monitor (e.g., one on the top, right side, left side, and bottom), around a room, around a doorway, by a door frame, and/or the like.

In the embodiments that use the gaze sequence 220 for authenticating a user 110, the gaze application 105 could use additional authentication metrics, such as, a password, a digital certificate, a biometric (e.g., a fingerprint scan, an iris (eye) scan, a palm print scan, a hearing range test, and/or the like) to authenticate the user 110.

The gaze application 105 may use different time periods to detect the gaze sequence 220. For example, there may be a two second gaze period where the user 110 looks at the specific gaze quadrant 201. When the user 110 is done with the gaze sequence 220, the user 110 can look for a longer period of time (e.g., 4 seconds) on the last gaze quadrant 201 to end the gaze sequence 220 entry (or look away for a period of time).

Figure 3:
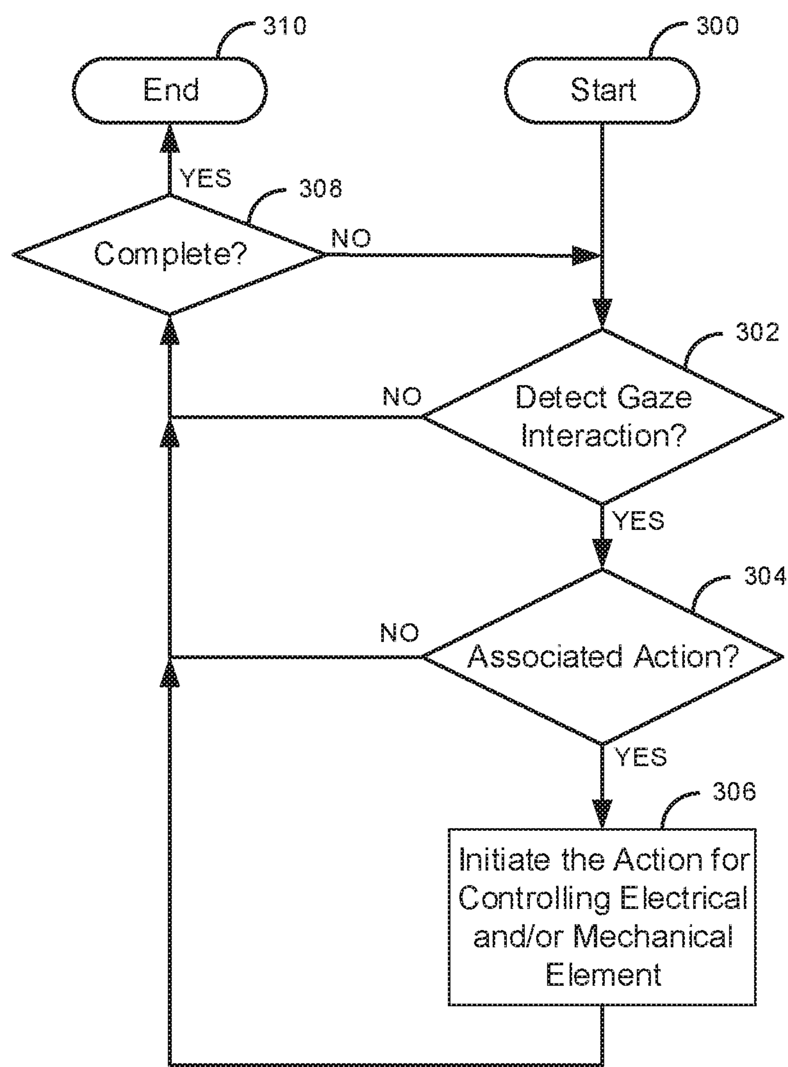
FIG. 3 is a flow diagram of a process for using gaze to control an electrical and/or mechanical element.
Figure 4:
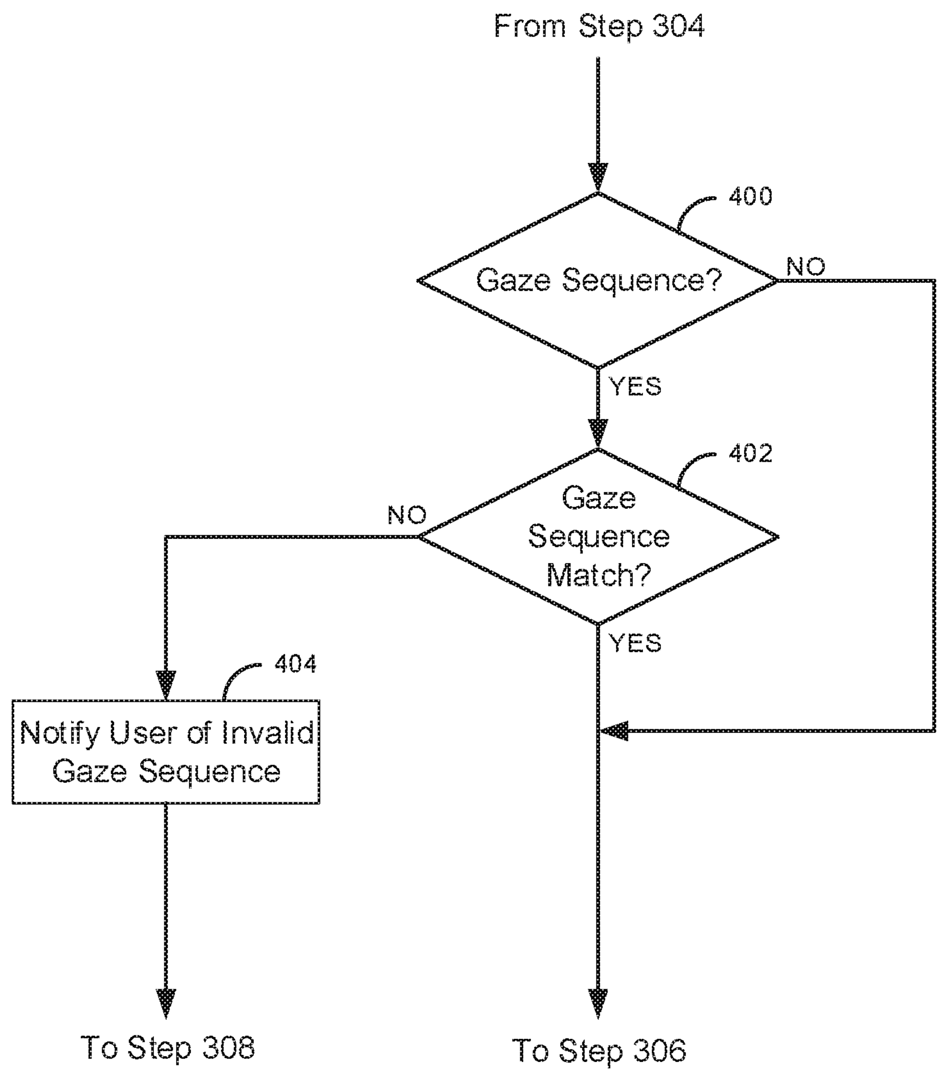
FIG. 4 is a flow diagram of a process for using a gaze sequence.
Figure 5:
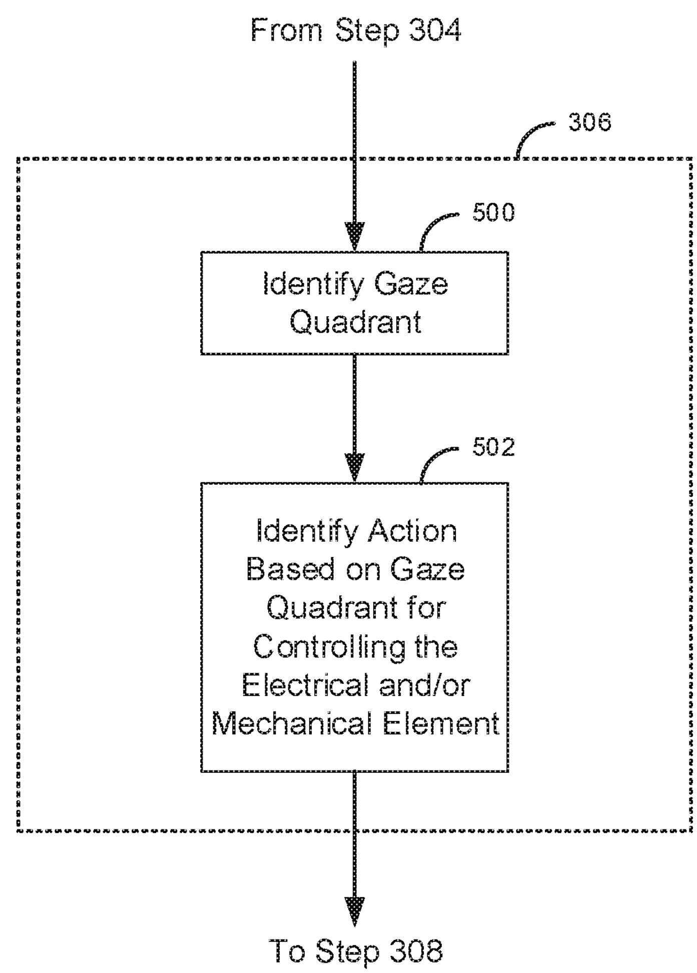
FIG. 5 is a flow diagram of a process for identifying a gaze quadrant.

FIG. 3 is a flow diagram of a process for using gaze to control an electrical and/or mechanical element 104. Illustratively, the camera(s) 101 and the gaze application 105 are stored-program-controlled entities, such as a computer or microprocessor 102, which performs the method of FIGS. 3-5 and the processes described herein by executing program instructions stored in a computer readable storage medium, such as a memory 103 (i.e., a computer memory, a hard disk, and/or the like). Although the methods described in FIGS. 3-5 are shown in a specific order, one of skill in the art would recognize that the steps in FIGS. 3-5 may be implemented in different orders and/or be implemented in a multi-threaded environment. Moreover, various steps may be omitted or added based on implementation.

The process starts in step 300. The gaze application 105 determines, in step 302, if a gaze interaction is detected. The gaze interaction is with one or more of the cameras 101. The gaze interaction can be where the user 110 is looking directly at the camera 101 or at an angle (e.g., as described in FIG. 2) from directly looking at the camera 101. If a gaze interaction is not detected in step 302, the gaze application 105 determines, in step 308, if the process is complete. If the process is complete in step 308, the process ends in step 310. Otherwise, the process goes back to step 302.

If the gaze interaction is detected in step 302, the gaze application 105 determines, in step 304, if there is an action associated with the gaze interaction. If there is not an action associated with the gaze interaction in step 304, the process goes to step 308. Otherwise, if the gaze application 105 identifies the associated action for controlling the electrical and/or mechanical element 104 in step 304, the gaze application 105 the initiates the action for controlling the electrical and/or mechanical element 104 in step 306. The process then goes to step 308.

To further illustrate the process of FIG. 3, consider the following non-limiting examples. While the non-limiting examples are discussed in regard to FIG. 3, one of skill in the art would clearly understand that these illustrative examples will also work with the embodiments discusses in FIGS. 1, 2, 4, and 5.

In one embodiment, assume that the electrical and/or mechanical element(s) 104 is a listening device with a camera 101 (e.g., an Amazon® Alexa). When the user 110 gazes at the camera 101 in the listening device, the listening device is turned on and asks the user 110 if he/she wants to place an order or asks a question. The advantage to this approach is that the listening device is only active for the period of time when the user 110 want to make an order or ask a question. The listening device is not constantly listening, thus addressing privacy concerns. In a similar manner, the user 110 can gaze at the listening device for a period of time to turn off the listening device (or based on a time period where no input is received).

The gaze detection of FIG. 3 can be used in a variety ways in a variety of devices/systems, such as, opening/closing a garage door, turning on/off a specific light or group of lights, turning on/off a specific sprinkler or group of sprinklers, alarming an alarm system, changing a temperature setting of a heating/air system, turning on/off the heating/air system, opening/closing a door, securing a house, activating a computer, initiating a call, turning on/off a printer/scanner, and/or the like.

In one embodiment, the gaze detection can be coupled with other types of user input, such as gestures, voice, touch, and/or the like. For example, a heating/air system may be turned on by the user 110 gazing at a controller for the heating/air system. The user 110 then may turn the temperature up or down based on a hand gesture. For example, the user 110 may turn down the heat setting by moving their hand in a downward motion or turn up the heat setting by moving their hand in an upward motion. In some embodiments, both gestures and gaze events may be required to initiate an action. For example, the gaze coupled with the user 110 moving their hand up may be required to turn the hearing system temperature setting up. The gaze/gesture events may also use other types of input, such as voice and touch.

Alternatively, the gaze detection can be coupled with touch and/or voice input. For example, a user's gaze may turn on a device and then the user 110 can press a button, touch a touch screen, speak a verbal command, and/or the like to implement a specific action.

FIG. 4 is a flow diagram of a process for using a gaze sequence 220. The process of FIG. 4 goes between steps 304 and 306 of FIG. 3. The process of FIG. 4 is based on the discussion of the gaze sequence 220 described in FIG. 2. As discussed in FIG. 2, the gaze sequence 220 is a series of gaze interactions that are typically used as part of a user authentication process.

However, in one embodiment, the gaze sequence 220 may be used for a non-authentication actions, such as multi-function control process. For example, a first gaze sequence 220 may be used to turn on/off a first light set and a second gaze sequence 220 may be used to turn on/off a second light set.

The gaze detection in step 302 of FIG. 2 may switch modes based on context. For example, when the user 110 first accesses a system, the gaze interaction of step 302 may be for detecting a gaze sequence 220 for authenticating a user 110. After the user 110 is authenticated, the gaze interaction of step 302 may switch to detecting a different type of gaze interaction. For example, the gaze interaction may cause a lighting system to turn on/off.

After determining that there is an action associated with the detected gaze interaction in step 304, the gaze application 105 determines if the gaze interaction is supposed to be for a gaze sequence 220 in step 400. If the gaze application 105 is not looking for a gaze sequence 220 in step 400, the process goes to step 306. Otherwise, if the gaze application 105 is looking for a gaze sequence 220 in step 400, the gaze application 105 determines, in step 402, if the entered gaze sequence 220 matches a stored gaze sequence (e.g., a stored PIN). If the gaze sequence matches, in step 402, the process goes to step 306 and initiates the action (e.g., to authenticate the user 110 and grant access to a secure room). If the gaze sequence 220 does not match in step 402, the gaze application 105 may optionally notify the user 110 of the invalid gaze sequence 220 in step 404. For example, the system may say "invalid gaze sequence entered. Try again." The process then goes to step 308.

FIG. 5 is a flow diagram of a process for identifying a gaze quadrant 201. FIG. 5 is an exemplary embodiment of step 306 of FIG. 3 where multiple gaze quadrants 201 are used (versus only a single gaze quadrant 201). After determining that there is an action associated with the gaze interaction in step 304, the gaze application 105 identifies the gaze quadrant 201 that the user 110 is looking at in step 500. The gaze application 105 identifies the action based on the gaze quadrant 201 for controlling the electrical and/or mechanical element 104 in step 502. The process then goes to step 308.

Any of the steps, functions, and operations discussed herein can be performed continuously and automatically.

To avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should, however, be appreciated that the present disclosure may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components of the system can be combined into one or more devices, such as a server, communication device, or collocated on a particular node of a distributed network, such as an analog and/or digital telecommunications network, a packet-switched network, or a circuit-switched network. It will be appreciated from the preceding description, and for reasons of computational efficiency, that the components of the system can be arranged at any location within a distributed network of components without affecting the operation of the system.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire, and fiber optics, and may take the form of acoustic or light waves, such as those generated during radio-wave and infra-red data communications.

While the flowcharts have been discussed and illustrated in relation to a particular sequence of events, it should be appreciated that changes, additions, and omissions to this sequence can occur without materially affecting the operation of the disclosed embodiments, configuration, and aspects.

A number of variations and modifications of the disclosure can be used. It would be possible to provide for some features of the disclosure without providing others.

In yet another embodiment, the systems and methods of this disclosure can be implemented in conjunction with a special purpose computer, a programmed microprocessor 102 or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors 102), memory 103, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor 102 or microcomputer systems being utilized.

In yet another embodiment, the disclosed methods may be partially implemented in software that can be stored on a storage medium, executed on programmed general-purpose computer with the cooperation of a controller and memory 103, a special purpose computer, a microprocessor 102, or the like. In these instances, the systems and methods of this disclosure can be implemented as a program embedded on a personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the embodiments with reference to particular standards and protocols, the disclosure is not limited to such standards and protocols. Other similar standards and protocols not mentioned herein are in existence and are considered to be included in the present disclosure. Moreover, the standards and protocols mentioned herein, and other similar standards and protocols not mentioned herein, are periodically superseded by faster or more effective equivalents having essentially the same functions. Such replacement standards and protocols having the same functions are considered equivalents included in the present disclosure.

The present disclosure, in various embodiments, configurations, and aspects, includes components, methods, processes, systems and/or apparatus substantially as depicted and described herein, including various embodiments, subcombinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease, and/or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights, which include alternative embodiments, configurations, or aspects to the extent permitted, including alternate, interchangeable and/or equivalent structures, functions, ranges, or steps to those claimed, whether or not such alternate, interchangeable and/or equivalent structures, functions, ranges, or steps are disclosed herein, and without intending to publicly dedicate any patentable subject matter.

Embodiments include a device comprising: a microprocessor; a computer readable medium, coupled with the microprocessor and comprising microprocessor readable and executable instructions that program the microprocessor to: detect a gaze interaction from a user or animal based on information received from a camera; in response to detecting the gaze interaction, identify an action for controlling one or more of an electrical element and a mechanical element; and initiate the action to control the one or more of the electrical element and the mechanical element.

Aspects of the above device include wherein the camera is in the device, wherein the action is to power on the device, and wherein the microprocessor readable and executable instructions further program the microprocessor to ask if the user wants to speak a voice command that controls the device.

Aspects of the above device include wherein the gaze interaction is based on gaze information received from a plurality of different cameras and wherein the gaze interaction is a sequence of gaze interactions with the plurality of different cameras that is used for at least one of: a user authentication process and a multi-function control process.

Aspects of the above device include wherein the sequence of gaze interactions with the plurality of different cameras is used for the user authentication process.

Aspects of the above device include wherein the sequence of gaze interactions with the plurality of different cameras is used for the multi-function control process.

Aspects of the above device include wherein the gaze interaction comprises a plurality of gaze quadrants that are used to initiate a plurality of different actions to control the one or more of the electrical element and the mechanical element.

Aspects of the above device include wherein the plurality of gaze quadrants are used as part of a gaze sequence for authenticating a user.

Aspects of the above device include wherein the gaze interaction is coupled with one or more gestures in order to initiate the action to control the one or more of the electrical element and the mechanical element.

Aspects of the above device include wherein detecting the gaze interaction is used to control an alarm system and wherein the action is to initiate different alarm actions based on whether the detected gaze interaction is a direct gaze interaction or an indirect gaze interaction.

Aspects of the above device include wherein the gaze interaction is coupled with one or more touch events to initiate the action to control the one or more of the electrical element and the mechanical element.

Aspects of the above device include wherein the gaze interaction is coupled with one or more voice commands to initiate the action to control the one or more of the electrical element and the mechanical element.

Embodiments include a method comprising: detecting, by a microprocessor, a gaze interaction from a user or animal based on information received from a camera; in response to detecting the gaze interaction, identifying, by the microprocessor, an action for controlling one or more of an electrical element and a mechanical element; and initiating, by the microprocessor, the action to control the one or more of the electrical element and the mechanical element.

Aspects of the above method include wherein the camera is in the device, wherein the action is to power on the device, and further comprising, asking, by the microprocessor, if the user wants to speak a voice command that controls the device.

Aspects of the above method include wherein the gaze interaction is based on gaze information received from a plurality of different cameras and wherein the gaze interaction is a sequence of gaze interactions with the plurality of different cameras that is used for at least one of: a user authentication process and a multi-function control process.

Aspects of the above method include wherein the sequence of gaze interactions with the plurality of different cameras is used for the user authentication process.

Aspects of the above method include wherein the gaze interaction comprises a plurality of gaze quadrants that are used to initiate a plurality of different actions to control the one or more of the electrical element and the mechanical element.

Aspects of the above method include wherein the plurality of gaze quadrants are used as part of a gaze sequence for authenticating a user.

Aspects of the above method include wherein the gaze interaction is coupled with one or more gestures in order to initiate the action to control the one or more of the electrical element and the mechanical element.

Aspects of the above method include wherein detecting the gaze interaction is used to control an alarm system and wherein the action is to initiate different alarm actions based on whether the detected gaze interaction is a direct gaze interaction or an indirect gaze interaction.

Aspects of the above method include wherein the gaze interaction is coupled with one or more touch events to initiate the action to control the one or more of the electrical element and the mechanical element.

The phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Aspects of the present disclosure may take the form of an embodiment that is entirely hardware, an embodiment that is entirely software (including firmware, resident software, micro-code, etc.) or an embodiment combining software and hardware aspects that may all generally be referred to herein as a "circuit," "module," or "system." Any combination of one or more computer-readable medium(s) may be utilized. The computer-readable medium may be a computer-readable signal medium or a computer-readable storage medium.

A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device. Program code embodied on a computer-readable medium may be transmitted using any appropriate medium, including, but not limited to, wireless, wireline, optical fiber cable, RF, etc., or any suitable combination of the foregoing.

The terms "determine," "calculate," "compute," and variations thereof, as used herein, are used interchangeably and include any type of methodology, process, mathematical operation or technique.

What is claimed is:

1. A device comprising:

a microprocessor;

a computer readable medium, coupled with the microprocessor and comprising microprocessor readable and executable instructions that program the microprocessor to:

detect a gaze interaction sequence from a user or animal based on information received from a camera, wherein the gaze interaction sequence comprises multiple gaze interactions in multiple locations;

in response to detecting the gaze interaction sequence, identify an action for controlling one or more of an electrical element and a mechanical element; and initiate the identified action to control the one or more of the electrical element and the mechanical element.

2. The device of claim 1, wherein the camera is in the device, wherein the action is to ask if the user wants to speak a voice command that controls the device.

3. The device of claim 1, wherein the action is at least one of: a user authentication process and a multi-function control process.

4. The device of claim 3, wherein the user authentication process comprises the user entering a Personal Identification Number (PIN).

5. The device of claim 3, wherein the multi-function control process comprises at least a first action to control a first electrical element or mechanical element and a second action to control a second electrical element or mechanical element.

6. The device of claim 1, further comprising:

a plurality of gaze quadrants that are used to detect the multiple gaze interactions in the multiple locations.

7. The device of claim 6, wherein the plurality of gaze quadrants are used as part of the gaze interaction sequence for authenticating the user.

8. The device of claim 1, wherein the gaze interaction sequence is coupled with one or more gestures in order to initiate the action to control the one or more of the electrical element and the mechanical element.

9. The device of claim 1, wherein detecting the gaze interaction sequence is used to control an alarm system and wherein the action is to initiate different alarm actions based on the detected gaze interaction sequence.

10. The device of claim 1, wherein the gaze interaction sequence is coupled with one or more touch events to initiate the action to control the one or more of the electrical element and the mechanical element.

11. The device of claim 1, wherein the gaze interaction sequence is coupled with one or more voice commands to initiate the action to control the one or more of the electrical element and the mechanical element.

12. A method comprising:

detecting, by a microprocessor, a gaze interaction from a user or animal based on information received from a camera, wherein the gaze interaction is determined using a plurality of gaze quadrants, and wherein each of the plurality of gaze quadrants is associated with a different action;

in response to detecting the gaze interaction, identifying, by the microprocessor, an action for controlling one or more of an electrical element and a mechanical element; and initiating, by the microprocessor, the identified action to control the one or more of the electrical element and the mechanical element.

13. The method of claim 12, wherein the camera is in a device, wherein the action is asking, by the microprocessor, if the user wants to speak a voice command that controls the device.

14. The method of claim 12, wherein the gaze interaction is based on a sequence of gaze interactions, wherein the sequence of gaze interactions comprise multiple gaze interactions in the plurality of gaze quadrants.

15. The method of claim 14, wherein the sequence of gaze interactions is used for a user authentication process.

16. The method of claim 14, wherein the sequence of gaze interactions is used to initiate a plurality of different actions to control the one or more of the electrical element and the mechanical element.

17. The method of claim 12, wherein the gaze interaction is used for a multi-function control process.

18. The method of claim 12, wherein the gaze interaction is coupled with one or more gestures in order to initiate the action to control the one or more of the electrical element and the mechanical element.

19. The method of claim 12, wherein detecting the gaze interaction is used to control an alarm system and wherein the action is to initiate different alarm actions based on the detected gaze interaction.

20. The method of claim 12, wherein the gaze interaction is coupled with one or more touch events to initiate the action to control the one or more of the electrical element and the mechanical element.

* * * * *